United States Patent Office 2,738,375
Patented Mar. 13, 1956

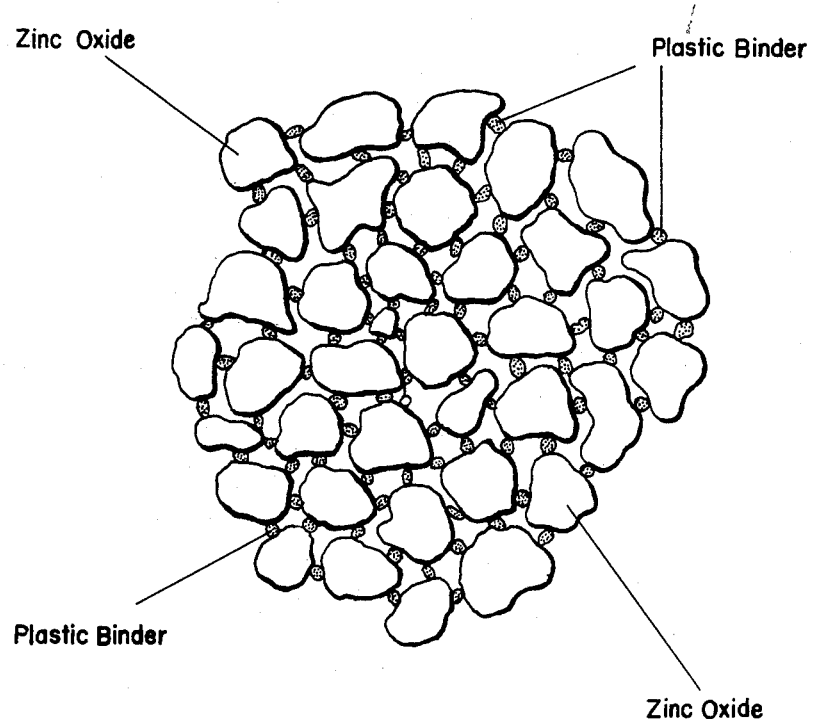

2,738,375

STORAGE BATTERY PLATES AND METHODS OF MANUFACTURING THE SAME

William J. Schlotter, Norristown, Pa., assignor to The Electric Storage Battery Company, a corporation of New Jersey Application February 11, 1953, Serial No. 336,451

12 Claims. (Cl. 136—30)

The invention relates to storage battery plates and to methods of manufacture thereof, and more particularly to battery plates of the type used in silver-zinc cells, and has for an object the provision of an improved plate of the pasted type and a new method of preparing said plate.

The customary method of manufacturing battery plates of the pasted type is to force into the open spaces or interstices of a supporting grid structure by any suitable means, a paste which may be comprised of a mixture of dry powdered active material, acid and water. Other materials may be added to the paste for purposes of varying the consistency thereof or improving the cohesiveness of the particles of active material. The pasted grid or plate is then subjected to heat in order to drive off the water, thereby leaving a mass of porous active material supported by the grid. The porous mass of active material thus produced on the grid or plate is generally possessed of poor cohesive qualities. This property will cause shedding of the particles of material from the grid structure during subsequent handling of the plate as during the assembling thereof in a suitable battery cell and during cycling of the cell in subsequent usage. In fact, such shedding of active material contributes substantially to numerous storage battery failures.

In order to avoid the premature disintegration of the plates, it has been found necessary to use extreme care when handling them subsequent to the drying operation, and particularly when assembling the plates in a battery container. It has been the practice when assembling the plates in the battery containers to pack them in such a manner as to immobilize them so that during shipment and when the container is being filled with electrolyte there is avoided shedding of the active material. This immobilization requires that the plates be packed in a tight relationship one to the other. However, upon expansion of the elements resulting from the addition of electrolyte and subsequent cycling, there results an undesirable compression thereof. This increased compression will result in batteries having poor discharge characteristics due to negative polarization. Further, the walls of the container tend to bulge and, in some cases, fracture, resulting in battery failure due to loss of electrolyte.

Another method proposed to prevent shedding of the particles of active material comprises the use of a binder comprised of a material such as natural rubber which when mixed with the paste forms a film of adhesive material throughout the porous mass of active material. However, the use of such a binder has proven unsatisfactory in the manufacture of pasted plates adapted for use in silver-zinc cells. For example, silver-zinc batteries preferably employ an alkaline electrolyte, such as potassium hydroxide, which would react with binders of natural rubber to the detriment of the cell.

In accordance with the present invention, there is avoided shedding of the particles of active material from the plate during assembly operations and during subsequent use of the battery by the use of a binder which not only forms a discontinuous film or web throughout the active material but also adequately binds the particles of zinc oxide together without serious reduction of the porosity of the plate.

In carrying out the invention in one form, an active material, such as zinc oxide, in a dry finely divided form, is mechanically mixed with a binder comprising a plastic latex which may be used to wet the material for pasting. The mixture or paste thus formed is then applied to a grid, either manually or mechanically, and forced into the spaces or interstices thereof. The binder, in a wet state and mixed with the active material, is possessed of cohesive qualities which maintains the active material as a unitary mass on the grid and thereby prevents shedding of the material during subsequent processing steps or usage of the battery. The pasted grid is then removed to an oven and the like to be subjected to heat in any desired manner, or air dried, in order to evaporate the water and other fluids present in the wet paste. Upon evaporation of the fluids from the paste, there is produced throughout the porous structure of the active material a web or discontinuous film of plastic latex which binds the individual particles of active material together in a porous mass. This construction is shown schematically in the accompanying drawing.

In carrying out the invention, care must be exercised in properly proportioning the amount of plastic latex binder to be mixed with the dry finely divided active material. As set forth above, it is imperative to maintain the porosity of the active material in order to present a maximum surface area to be subjected to the action of the electrolyte. If the binder were to be present in too great an amount, it would form a continuous film, the particles of active material would be insulated and sealed from contact with the electrolyte and, therefore, would not undergo the desired electrochemical reaction. On the other hand, if the proportion of plastic latex binder added to the active material should be too small, there would be formed an incomplete web which, while not affecting the porosity of the active material, would not have the requisite mechanical strength to bind the particles of the zinc oxide together.

It has been found, in order satisfactorily to form a web or discontinuous film of plastic latex binder that will provide the desired characteristics of maintaining the active material as a unitary mass without affecting to any great extent the porosity thereof, that the selected plastic latex must be mixed with an active material such as zinc oxide in a proportion of from 8% to 10% by weight of the zinc oxide. The selected percentage is a critical factor. As set forth above, if the proportion or the percentage is too large, that is, if it is increased above 10%, there will result the objectionable continuous film completely covering the individual particles of zinc oxide and rendering inoperative the activity of the plate. If the percentage of binder is below 8%, there will be produced the unsatisfactory web aforementioned which fails adequately to bind the zinc oxide particles in a unitary mass. When the process, which is the subject of this invention, is followed, the battery plate thereby prepared may be satisfactorily handled during all steps of operation in assembly and use and may even be dropped or bent after drying without objectionable loss of active material therefrom.

As set forth above, this invention is particularly suited to the manufacture of dry unformed batteries of the silver-zinc type having negative plates composed of zinc and including potassium hydroxide as an electrolyte. Plastic latexes, such as polystyrene latex, butadiene-styrene latex, and polyvinyl chloride latex have proven to be suitable materials for forming the desired binder film. These particular binding materials are not adversely affected by the presence of the potassium hydroxide electrolyte. The butadiene-styrene latex is preferred as a binder since it may be acquired commercially with a proper stabilizer for maintaining the latex in a colloidal state. However, and regardless of specific preparations, it has been found that a suitable binder may be formed containing butadiene and styrene in the range of from 20% to 80%, the amount of one ingredient, of course, varying inversely with the amount of the other ingredient.

The critical percentages of binder material set forth above may be varied to some degree by the addition to the process of a further step. The amount of the plastic binder may be varied through a range of 5% to 8% by subjecting a dry pasted plate to a press and applying a pressure of from about 500 pounds per square inch up to about 6000 pounds per square inch to the plate. This additional pressing step tends to disperse the plastic binder more completely throughout the porous mass of the active material and, therefore, a lower percentage of plastic latex may be used for effecting the desired web or discontinuous film. Therefore, with the use of the additional pressing step an adequate binder is formed by using a percentage of from 5% to 8% by weight of zinc oxide of any of the preferred plastic latexes set forth above, and without the pressing step, the percentage of the selected latex binder will be from 8% to 10% by weight of zinc oxide.

While all of the reasons why the above-discussed critical percentages of latex are so satisfactory are not fully known, it is believed the following discussion refers to some of the major contributing factors. Apparently, there is a relationship between the particle size of the solid materials which make up the paste and the amount of synthetic latex which should be utilized. Thus, the zinc oxide is, in general, in finely divided form and because of such fineness can only tolerate narrow percentages of latex binder ranging from about 8% to 10% by weight of zinc oxide. There may be further considered the viscosity or flow characteristics of latex during drying and subsequent use of the plate. If the viscosity is low, it will be seen that surface tension and the like may cause the plastic completely to enclose the individual particles, whereas with a higher viscosity plastic the enveloping action will be incomplete and porosity of the plate maintained. Thus, with the invention applied to active materials other than zinc, higher percentages, somewhat in excess of the preferred and critical range for the zinc oxide, may be anticipated.

While preferred forms of the invention have been set forth, it is to be understood that variations may be made within the scope of the appended claims.

What is claimed is:

1. The method of forming battery plates which comprises mixing a finely divided zinc oxide with a binder of plastic latex in the amount of from 8% to 10% by weight of active material to form a paste, applying the paste to a battery plate, and drying the paste to form throughout the active material a discontinuous film of plastic binder which engages individual particles of the active material to bind them together on the plate.

2. The method of constructing battery plates which comprises applying a paste comprised of a mixture of a finely divided zinc oxide and a plastic binding material in the amount of from 8% to 10% by weight of the active material to a grid, and drying the plate thereby produced to remove fluids therefrom and to form therethrough a discontinuous plastic film extending partially about each particle of active material to bind the particles together.

3. The method of constructing battery plates which comprises applying a mixture of a finely divided zinc oxide and a plastic binding material in the amount of from 8% to 10% by weight of active material to a grid, said plastic binding material being selected from the group consisting of polyvinyl chloride latex, butadiene-styrene latex and polystyrene latex, and drying the paste to remove fluids therefrom and to form through the paste a plastic web which extends partially about each particle of active material to bind the material in a unitary mass.

4. The method of forming battery plates which comprises mixing a dry finely divided zinc oxide with a binder comprising a stabilized colloidal water dispersion of a plastic resin in the amount of from 8% to 10% by weight of active material to form a paste, applying the paste to a battery plate, and drying the paste to form a discontinuous film of plastic latex which engages individual particles of the active material to bind them together on the plate.

5. The method of forming battery plates for use in a silver-zinc battery which comprises mixing dry finely divided zinc oxide with a binder of butadiene-styrene plastic latex in amount of from 8% to 10% by weight of active material to form a paste, the butadiene and styrene being in a percentage range of from 20% to 80%, and drying the paste to form a discontinuous film of plastic latex which extends partially about each particle of the zinc oxide to form a unitary mass.

6. The method of forming battery plates which comprises mixing a zinc oxide with a binder of plastic latex in amount of from 5% to 8% by weight of active material to form a paste, applying the paste to a battery plate, drying the paste, and subjecting the plate to pressures of from about 500 pounds per square inch up to about 6000 pounds per square inch to unite the plastic latex particles throughout the active material to form a discontinuous film of plastic latex which engages individual particles of the active material to bind them together.

7. The method according to claim 6 in which the binder of plastic latex is selected from the group consisting of polyvinyl chloride latex, butadiene-styrene latex and polystyrene latex.

8. The method according to claim 6 in which the binder of plastic latex is butadiene-styrene latex having a butadiene content of from 20% to 80%.

9. A battery plate of the negative type used in the caustic electrolyte of silver-zinc batteries comprising a grid, and a porous mass of zinc oxide formed on said grid and having a discontinuous plastic film formed throughout said mass, said plastic film engaging individual particles of the zinc oxide to maintain the zinc oxide as a unitary mass and being inert to a caustic electrolyte.

10. A battery plate of the unformed type to be used in silver-zinc batteries and possessed of non-shedding characteristics, said plate comprising a grid for receiving a porous mass of zinc oxide having a discontinuous plastic film formed throughout and engaging individual particles of the zinc oxide, said plastic film comprised of a plastic latex selected from the group consisting of polyvinyl chloride latex, butadiene-styrene latex and polystyrene latex.

11. A battery plate of the type to be used in a caustic electrolyte of silver-zinc battery cells comprising a grid, a porous mass of zinc oxide formed on said grid and having a discontinuous plastic film formed throughout said mass and engaging individual particles of the active material, said plastic film comprised of a plastic latex inert to a caustic electrolyte and selected from the group consisting of polyvinyl chloride latex, butadiene-styrene latex and polystyrene latex, the proportion of plastic latex to zinc oxide being in amount of from 5% to 10% by weight of zinc oxide.

12. A battery plate comprising a porous mass of zinc oxide having a discontinuous plastic film formed throughout and engaging individual particles of the active material, said plastic film being comprised of a plastic latex selected from the group consisting of polyvinyl chloride latex, butadiene-styrene latex and polystyrene latex.

References Cited in the file of this patent

UNITED STATES PATENTS

| | | |
|---|---|---|
| 2,561,943 | Moulton et al. | July 24, 1951 |
| 2,601,133 | Yardney | June 17, 1952 |
| 2,677,713 | Weil et al. | May 4, 1954 |